(12) United States Patent
Dvorak et al.

(10) Patent No.: US 9,971,583 B2
(45) Date of Patent: May 15, 2018

(54) COMMON DEPLOYMENT MODEL

(71) Applicant: Hewlett-Packard Development Company, L.P., Houston, TX (US)

(72) Inventors: Martin Dvorak, Prague (CZ); Kishore Jagannath, Bangalore (IN); Adarsh Suparna, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 834 days.

(21) Appl. No.: 14/529,476

(22) Filed: Oct. 31, 2014

(65) Prior Publication Data

US 2016/0124734 A1    May 5, 2016

(51) Int. Cl.
  *G06F 9/45*  (2006.01)
  *G06F 9/445*  (2018.01)
  *G06F 17/50*  (2006.01)
(52) U.S. Cl.
  CPC .............. *G06F 8/60* (2013.01); *G06F 17/50* (2013.01); *G06F 2217/04* (2013.01)
(58) Field of Classification Search
  CPC .................................................. G06F 8/60
  USPC ................................................... 703/22
  See application file for complete search history.

(56) References Cited

U.S. PATENT DOCUMENTS

| 2004/0177352 | A1  | 9/2004  | Narayanaswamy et al. |
| 2011/0131557 | A1  | 6/2011  | Bouillet et al. |
| 2012/0290348 | A1* | 11/2012 | Hackett ............... G06Q 10/06 705/7.13 |
| 2014/0074973 | A1  | 3/2014  | Kumar et al. |
| 2015/0058467 | A1* | 2/2015  | Douglas ............ G06Q 10/0631 709/223 |

FOREIGN PATENT DOCUMENTS

CN          103685568        3/2014

OTHER PUBLICATIONS

Chalmers, R. et al., Anuta Networks Aims to Speed Cloud Deployments by Simplifying Network Service, Feb. 5, 2013, 4 pages.

* cited by examiner

*Primary Examiner* — Timothy A Mudrick
(74) *Attorney, Agent, or Firm* — Brooks, Cameron & Huebsch, PLLC

(57) ABSTRACT

In one implementation, a system for a common deployment model includes a content engine to embrace content from a number of deployment tools, a properties engine to associate a number of properties from the content to generate a component model for the number of deployment tools, a cost engine to associate the component model with a cost model, and a fulfillment engine to instantiate the component model with the associated cost model.

20 Claims, 5 Drawing Sheets

COMMON DEPLOYMENT MODEL

BACKGROUND

A number of applications can be deployed by a data center using a number of different deployment tools. Deployment tools can include rules, configurations, and processes that are specific to a corresponding deployment tool. Compatibility between deployment tools can be difficult with the specific rules, configurations, and processes for each deployment tool. When a particular deployment tool is utilized to deploy an application it can be difficult to change deployment tools to execute the same application.

DETAILED DESCRIPTION

Figure 1:
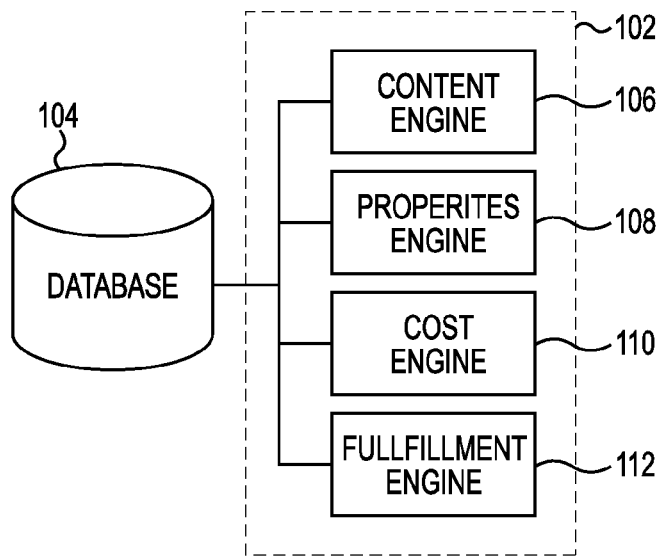
FIG. 1 illustrates a diagram of an example of a system for a common deployment model according to the present disclosure.

A number of methods, systems, and computer readable medium for a common deployment model are described herein. The common deployment model can be utilized to execute a number of services and/or applications utilizing a single deployment tool even when the number of services and/or applications are being deployed by a number of different deployment tools. The application can be a multi-tier application. As used herein, a multi-tier application is an application that utilizes at least two different servers to execute the application.

As used herein, an application that utilizes a number of different deployment tools includes utilizing a number of deployment tools that are different than a deployment tool that is being utilized to manage the application. For example, the application can be an application that is being executed by Chef. In this example, the application can be managed by a different deployment tool such as HP Operation Orchestration (HP OO). In this example, the HP OO can utilize the common deployment model to determine a number of relationships for the application and send instructions to the Chef deployment tool to execute the application.

The common deployment model can be generated by embracing instances and/or services related to the application. As used herein, an instance is a specific realization of an object that can be executed by a processing resource. As used herein, the instances can be executed instructions relating to the application deployment. As used herein, the services related to the application includes the services provided when the application is executed. Embracing the services related to the application deployment can include monitoring the services of the application when the services and/or instances are executed. Embracing the services related to the application can include monitoring and/or reading scripts relating to a deployment tool that is executing the application deployment process. For example, the scripts of a Chef deployment tool can be included in a Cookbooks database. In this example, embracing the services of the Chef deployment tool can include reading the scripts that correspond to the services in the Cookbooks database. As used herein, scripts are programs written for a run-time environment that can interpret and automate an execution of tasks or functions.

By generating the common deployment model, a single deployment tool (e.g., master deployment tool) can be utilized to manage and execute a plurality of different applications that are utilizing a number of different deployment tools. For example, the single deployment tool can be an HP operation orchestration (HP OO) deployment tool. In this example, the HP OO deployment tool can be utilized to monitor and manage applications that are being deployed by different deployment tools such as, but not limited to: Chef deployment tools, Juju deployment tools, among other deployment tools. Since changing the deployment tools for an application can be a difficult process, it can be advantageous to manage a number of applications with different deployment tools utilizing a single deployment tool.

Figure 2:
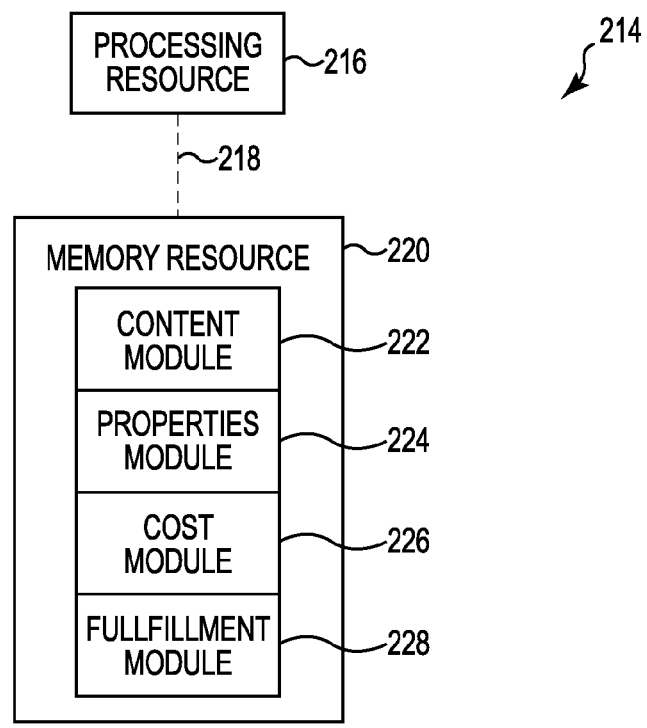
FIG. 2 illustrates a diagram of an example computing device according to the present disclosure.

FIGS. 1 and 2 illustrate examples of system 100 and computing device 214 according to the present disclosure. FIG. 1 illustrates a diagram of an example of a system 100 for a common deployment model according to the present disclosure. The system 100 can include a database 104, a common deployment model system 102, and/or a number of engines (e.g., content engine 106, properties engine 108, cost engine 110, fulfillment engine 112). The common deployment model system 102 can be in communication with the database 104 via a communication link, and can include the number of engines (e.g., content engine 106, properties engine 108, cost engine 110, fulfillment engine 112). The common deployment model system 102 can include additional or fewer engines that are illustrated to perform the various functions as will be described in further detail in connection with FIGS. 3-6.

The number of engines (e.g., content engine 106, properties engine 108, cost engine 110, fulfillment engine 112) can include a combination of hardware and programming, but at least hardware, that is configured to perform functions described herein (e.g., embrace content from a number of deployment tools, associate a number of properties from the content to generate a component model for the number of deployment tools, associate the component model with a cost model, instantiate the component model with the associated cost model, etc.). The programming can include program instructions (e.g., software, firmware, etc.) stored in a memory resource (e.g., computer readable medium, machine readable medium, etc.) as well as hard-wired program (e.g., logic).

The content engine 106 can include hardware and/or a combination of hardware and programming, but at least hardware, to embrace content from a number of deployment tools. The content engine 106 can embrace content from the number of deployment tools by monitoring a number of services that are executed by the number of deployment tools.

In some embodiments, the content engine can embrace content from the number of deployment tools by reading a number of scripts associated with the number of deployment tools. For example, the content engine 106 can embrace content from a Chef deployment tool by reading a number of scripts from cookbooks that are associated with particular services of the Chef deployment tool. In some embodiments, the content engine 106 can convert the number of scripts associated with a deployment tool to a number of values that can be utilized to generate the component model. In some embodiments, the content from the deployment tool can include other information relating to executing services via the deployment tool.

The properties engine 108 can include hardware and/or a combination of hardware and programming, but at least hardware, to associate a number of properties from the content to generate a component model for the number of deployment tools. The component model for the number of deployment tools can include specifying a set of components along with a number of properties from the content to generate a component model that includes a server component, a platform component and an application.

The generated model can include a specific set of components along with the number of properties for a multi-tier application. For example, a multi-tier application can include a first application that is deployed on a first server and a second application that is deployed on a second server. In this example, the generated model can specify the applications and properties of the instances deployed by the first server and the second server. In addition, the generated model can specify the relationships between the applications and properties of the instances deployed by the first server and the second server.

The cost engine 110 can include hardware and/or a combination of hardware and programming, but at least hardware, to associate the component model with a cost model. The cost engine 110 can attach a particular cost to the generated model prior to instantiating the generated model. Instantiating the generated model can include providing the generated model into a database that can be accessed by a number of users. For example, the generated model can be uploaded to a database where the generated model and associated cost model can be accessed by a number of users.

The fulfillment engine 112 can include hardware and/or a combination of hardware and programming, but at least hardware, to instantiate the component model with the associated cost model. The fulfillment engine 112 can upload the generated model to a database where the generated model and associated cost model can be accessed by a number of users. The fulfillment engine 112 can execute a number of services associated with the number of deployment tools utilizing the component model. For example, the fulfillment engine 112 can be utilized execute the number of services by executing the determined scripts to perform the number of services.

As described herein, the number of services can be executed by a multi-tier application. When the number of services are executed by a multi-tier application the fulfillment engine 112 can send instructions via a single deployment tool to the number of deployment tools of the multi-tier application and the application can be executed via the number of deployment tools. The fulfillment engine 112 can utilize the generated model to determine what deployment tools are necessary for the execution of the number of services.

By utilizing the generated model to execute the number of services the existing deployment tools can be utilized to execute the number of services via a single deployment tool. This can be advantageous over previous methods by integrating a single deployment tool to execute applications that utilize a number of different deployment tools. That is, a single platform with a single deployment tool can be utilized to execute and manage all processes of the number of different deployment tools.

FIG. 2 illustrates a diagram of an example computing device 214 according to the present disclosure. The computing device 214 can utilize software, hardware, firmware, and/or logic to perform functions described herein.

The computing device 214 can be any combination of hardware and program instructions configured to share information. The hardware, for example, can include a processing resource 216 and/or a memory resource 220 (e.g., computer-readable medium (CRM), machine readable medium (MRM), database, etc.). A processing resource 216, as used herein, can include any number of processors capable of executing instructions stored by a memory resource 220. Processing resource 216 may be implemented in a single device or distributed across multiple devices. The program instructions (e.g., computer readable instructions (CRI)) can include instructions stored on the memory resource 220 and executable by the processing resource 216 to implement a desired function (e.g., monitor a load time of each of a number of elements displayed on a window of a user interface, assign a color to each of the number of elements based on the load time, generate a component color map of the window based the color assigned to each of the number of elements, etc.).

The memory resource 220 can be in communication with a processing resource 216. A memory resource 220, as used herein, can include any number of memory components capable of storing instructions that can be executed by processing resource 216. Such memory resource 220 can be a non-transitory CRM or MRM. Memory resource 220 may be integrated in a single device or distributed across multiple devices. Further, memory resource 220 may be fully or partially integrated in the same device as processing resource 216 or it may be separate but accessible to that device and processing resource 216. Thus, it is noted that the computing device 214 may be implemented on a participant device, on a server device, on a collection of server devices, and/or a combination of the participant device and the server device.

The memory resource 220 can be in communication with the processing resource 216 via a communication link (e.g., a path) 218. The communication link 218 can be local or remote to a machine (e.g., a computing device) associated with the processing resource 216. Examples of a local communication link 218 can include an electronic bus internal to a machine (e.g., a computing device) where the memory resource 220 is one of volatile, non-volatile, fixed, and/or removable storage medium in communication with the processing resource 216 via the electronic bus.

A number of modules (e.g., content module 222, properties module 224, cost module 226, fulfillment module 228) can include CRI that when executed by the processing resource 216 can perform functions. The number of modules (e.g., content module 222, properties module 224, cost module 226, fulfillment module 228) can be sub-modules of other modules. For example, the properties module 224 and the cost module 226 can be sub-modules and/or contained within the same computing device. In another example, the number of modules (e.g., content module 222, properties module 224, cost module 226, fulfillment module 228) can comprise individual modules at separate and distinct locations (e.g., CRM, etc.).

Each of the number of modules (e.g., content module 222, properties module 224, cost module 226, fulfillment module 228) can include instructions that when executed by the processing resource 216 can function as a corresponding engine as described herein. For example, the content module 222 can include instructions that when executed by the processing resource 216 can function as the content engine 106. In another example, the properties module 224 can include instructions that when executed by the processing resource 216 can function as the properties engine 108. In another example, the cost module 226 can include instructions that when executed by the processing resource 216 can function as the cost engine 110. Furthermore, in another example, the fulfillment module 228 can include instructions that when executed by the processing resource 216 can function as the fulfillment engine 112.

Figure 3:
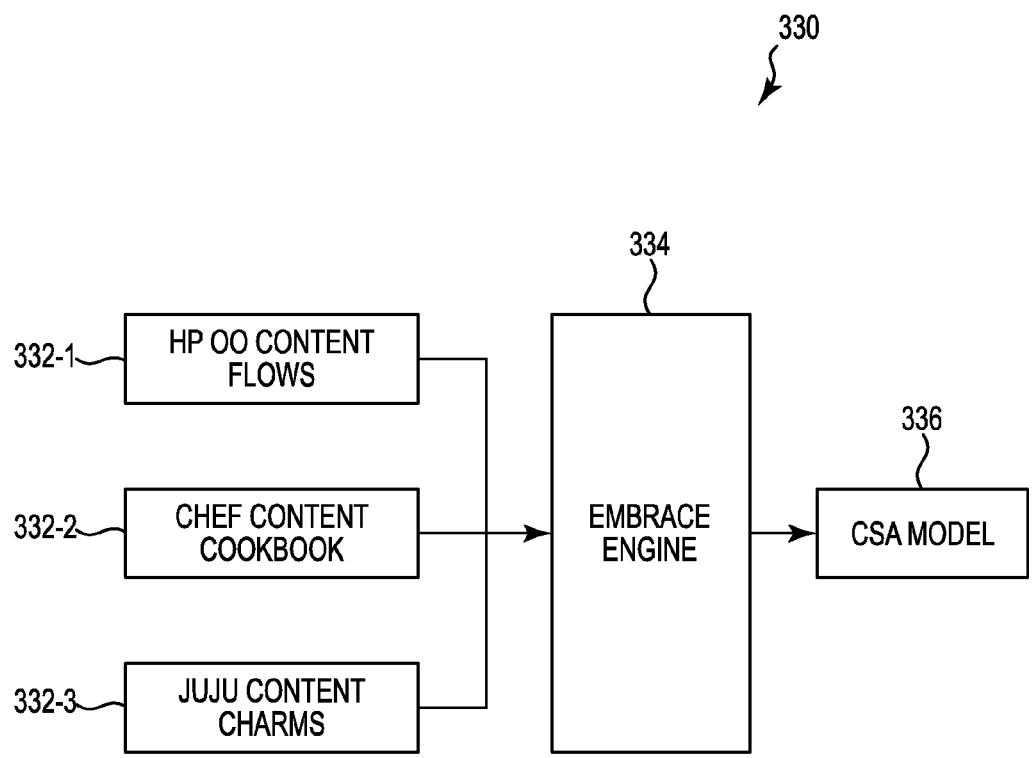
FIG. 3 illustrates flow diagram for a common deployment model according to the present disclosure.

FIG. 3 illustrates flow diagram 330 for a common deployment model according to the present disclosure. The flow diagram 330 can include a basic representation of embracing content from a number of deployment tools 332-1, 332-2, 332-3.

The number of deployment tools 332-1, 332-2, 332-3 can include a number of different deployment tools 332-1, 332-2, 332-3. For example, deployment tool 332-1 can include content for a HP OO deployment tool, deployment tool 332-2 can include content for a Chef deployment tool, and deployment tool 332-3 can include content for a Juju deployment tool. In this example, the content can include a number of properties of a number of services and/or applications that are being executed by the corresponding deployment tools 332-1, 332-2, 332-3. The properties can include, but are not limited to: template name, user ID, passwords, etc.

The embrace engine 334 can be utilized to embrace the content from each of the deployment tools 332-1, 332-2, 332-3 and utilize the content as described herein to generate a model 336. The embrace engine 334 can be a single engine and/or a number of separate engines (e.g., content engine 106, properties engine 108, cost engine 110, fulfillment engine 112 as referenced in FIG. 1).

As described herein, the embrace engine 334 can embrace the content of the deployment tools 332-1, 332-2, 332-3 by monitoring the execution of services and/or applications from the deployment tools 332-1, 332-2, 332-3. In addition, the embrace engine 334 can embrace the content of the deployment tools 332-1, 332-2, 332-3 by reading a number of scripts associated with services and/or applications executed by the deployment tools 332-1, 332-2, 332-3.

The embrace engine 334 can utilize the embraced content from the deployment tools 332-1, 332-2, 332-3 to generate the model 336. In some embodiments, the model 336 can include a single model representation of the embraced content within a cloud service automation (CSA) model. The CSA model can be implemented by CSA software. As used herein, the CSA software is a cloud management software that is utilized to automate the management of cloud based computing services.

The model 336 can be executed by a single platform utilizing a single deployment tool type. For example, the model 336 can be executed by a platform utilizing HP OO. In this example, the platform can utilize the generated model 336 to execute instances of an application. In this example, when an application utilizing HP OO is requested, the HP OO deployment tool can execute the application. In the same example, when an application utilizing Chef or Juju deployment tools is requested, the HP OO deployment tool can invoke the Chef or Juju deployment tools based on the model 336. In this example, applications utilizing different deployment tools can be managed and executed by the platform utilizing only HP OO.

Figure 4:
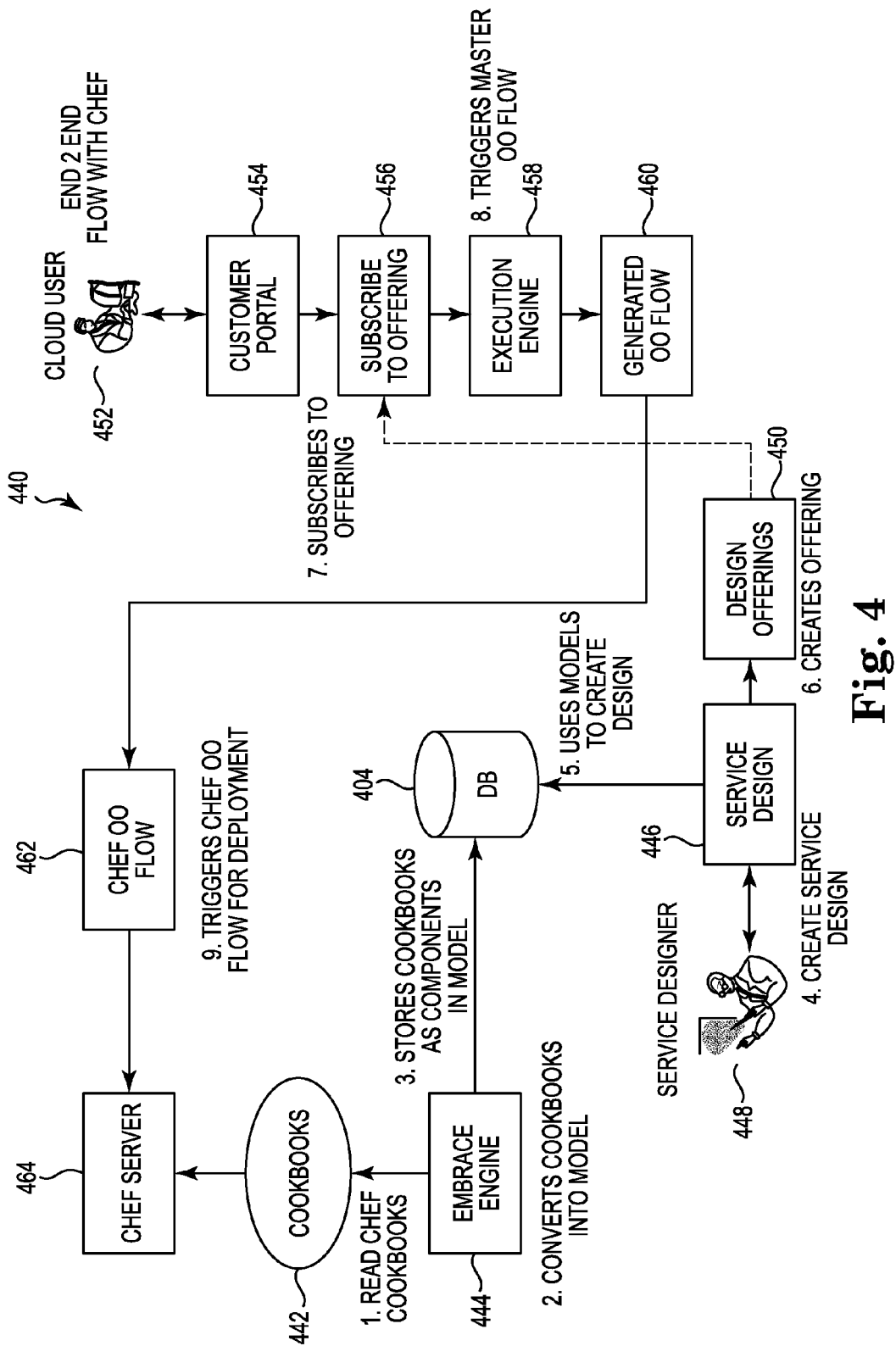
FIG. 4 illustrates flow diagram for a common deployment model according to the present disclosure.

FIG. 4 illustrates flow diagram 440 for a common deployment model according to the present disclosure. The flow diagram 440 can represent how applications and instances can be embraced to generate a model that can be utilized to generate a number of designs. The number of designs can be utilized to execute particular instances and applications with a particular platform utilizing a single deployment tool.

In some embodiments, an embrace engine 444 can embrace content from a particular deployment tool (e.g., Chef, Juju, HP OO, etc.). As described herein, the embrace engine 444 can read a number of scripts from a database 442. For example, the deployment tool can include Chef deployment tools that includes a Cookbooks database 442. The embrace engine 444 can monitor and/or read the scripts that are stored in the Cookbooks database 442. The embrace engine 444 can convert the scripts that are stored in the Cookbooks database 442 into a model.

As described herein, the model can be a digital representation of relationships that correspond to applications that are executed by a number of different deployment tools. The model can comprise a number of components that are generated based on the number of scripts. The number of components can include information relating to a topology of physical resources and cloud resources. In addition, the number of components can include relationships of physical resources and processes for executing a number of instances and/or applications via a number of deployment tools.

The number of models that are generated from embracing the instances of the deployment tools can be stored in a model database 404. The number of models that are generated can be utilized by a service designer 448 to create a service design 446 for a particular application and/or a number of services. The service design 446 can include instructions that can be executed to execute a particular application and/or a number of services.

The service design 446 can be tested to confirm that execution of the service design 446 properly executes a corresponding application and/or number of services. A design offering 450 can be established when it is determined that the service design 446 is properly executing a corresponding application and/or number of services. The design offering 450 can be displayed via a customer portal 454 that enables selection of the service design 446.

A cloud user 452 can utilize the customer portal 454 to select service designs that can implement a particular application and/or services provided by a cloud computing system. The customer portal 454 can be a user interface that enables users to select and customize a number of applications that are provided by the cloud computing network. The customer can subscribe to offerings at 456 through the customer portal 454. As used herein, subscribing to an offering includes selection of the offering that includes the service design 446. In some embodiments, subscribing to an offering can include purchasing the design offering 450. The purchase of the design offering 450 can include a purchase price that can be based on a cost model.

When the design offering 450 is subscribed at 456 the user 452 can execute the service design 446 via an execution engine 458. The execution engine 458 can execute a particular deployment tool (e.g., HP OO, Juju, Chef, etc.) to act as a master deployment tool. In some embodiments the HP OO deployment tool can act as the master deployment tool. In these embodiments, a OO flow 460 from the HP OO deployment tool can be executed by the execution engine 458.

The generated OO flow 460 can include the service design 446 based on the model generated by the embrace engine 444. The generated OO flow 460 can include executing a number of applications and/or services. As described herein, the number of applications and/or services can be executed by a number of different deployment tools. When the generated OO flow 460 is directed to executing an application and/or service that is executable by a HP OO deployment tool, the OO flow 460 can invoke the HP OO deployment tool to execute the application and/or service. When the generated OO flow 460 is directed to executing an application and/or service that is executable by a Chef deployment tool, the OO flow 460 can invoke a Chef OO flow 462 via a Chef deployment tool. The Chef OO flow 460 is thus managed and executed by the execution engine 458 that utilizes HP OO deployment tools. The Chef OO flow 462 can be executed by the Chef server 464.

The flow diagram 440 illustrates when an HP OO deployment tool is utilized as a master deployment tool, but as described herein, the master deployment tool can be a number of different deployment tools. In addition, the flow diagram 440 illustrates a Chef server 464, a Chef Cookbooks 442, and/or a Chef OO flow, but the other deployment tools under the master deployment tool can include a number of other different deployment tools. The flow diagram 440 illustrates an embodiment to manage multiple different deployment tools via a single execution engine that utilizes a single type of deployment tool.

Figure 5:
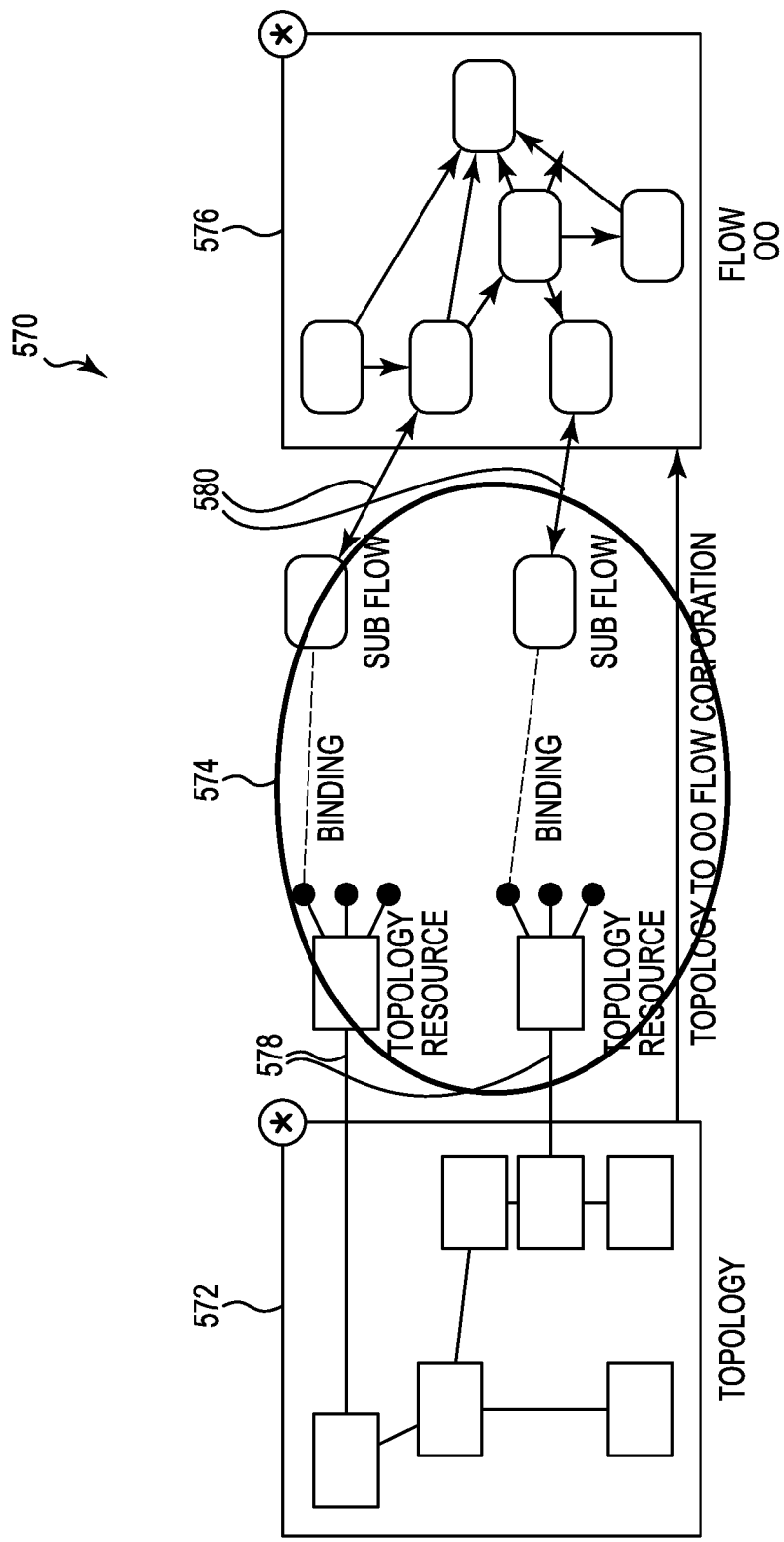
FIG. 5 illustrates a common deployment model according to the present disclosure.

FIG. 5 illustrates a common deployment model 570 according to the present disclosure. The common deployment model 570 can depict a number of components of a service design that is mapped for a particular deployment tool. As used herein, the number of components can include a digital representation of values and/or content embraced by an embrace engine. For example, the common deployment model can depict a number of components of a service design that is mapped for an HP OO deployment tool.

The common deployment model 570 can include connecting and/or associating physical resources from a topology 572 to execution logic 576 via a number of defined relationships 574. In some embodiments, the topology 572 can include a physical topology of a number of different deployment tools. For example, the topology 572 can include a topology of resources that are related to a particular deployment tool. For example, the topology 572 can be a digital representation of relationships between physical resources of a Chef deployment tool. In this example, the execution logic 576 can be a representation of a Flow OO for an HP OO deployment tool.

The defined relationships 574 can be associated at 580 to the execution logic 576. The defined relationships 574 can be associated at 578 to the topology 572. Thus, the execution logic 576 is associated to the topology 572 via the defined relationships.

The defined relationships 574 can be utilized by the HP OO deployment tool to invoke a different deployment tool associated with the topology 572. Thus the defined relationships 574 can define a flow from the execution logic of the HP OO deployment tool to the execution of applications and/or services via the different deployment tools.

Figure 6:
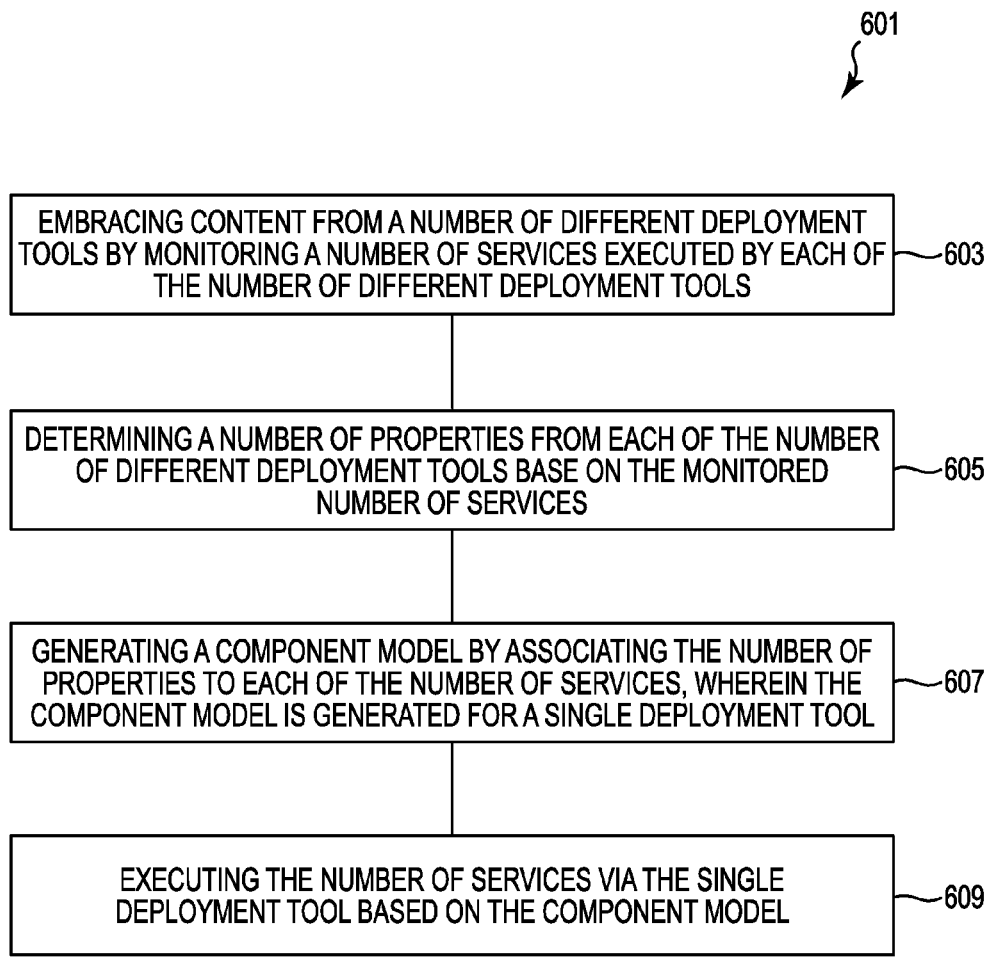
FIG. 6 illustrates a diagram for a method for generating a common deployment model according to the present disclosure.

FIG. 6 illustrates a diagram for a method 601 for generating a common deployment model according to the present disclosure. The method 601 can be executed by a system comprising a number of engines as described in reference to FIG. 1 and/or a computing device as described in reference to FIG. 2. The method 601 can be utilized to manage and execute a plurality of applications that operate on a number of different deployment tools via a single platform utilizing a single deployment tool. In some embodiments, as described herein, the single deployment tool can be a master deployment tool that is utilized to execute applications that utilize the same format as the master deployment tool and invokes the number of different deployment tools when an application is in a format of one of the number of different deployment tools. The platform utilizing the master deployment tool can perform these functions by generating a common deployment model from content that is embraced from the number of different deployment tools.

At box 603 the method 601 can include embracing content from a number of different deployment tools by monitoring a number of services executed by each of the number of different deployment tools. As described herein, embracing content from the number of different deployment tools can include a number of monitoring techniques for monitoring deployed applications and/or instances from the number of different deployment tools.

In some embodiments, embracing content from the number of different deployment tools can include reading a number of scripts from a script database corresponding to the number of different deployment tools. For example, embracing the content can include an engine (e.g., content engine 106 as referenced in FIG. 1, embrace engine 334 as referenced in FIG. 3, embrace engine 444 as referenced in FIG. 4, etc.) that can read a number of scripts from a script database related to the number of different deployment tools.

Embracing content from the number of different deployment tools can include an engine from a platform utilizing a first deployment tool reading a number of scripts from a script database for a second deployment tool. For example, a platform utilizing a HP OO deployment tool can utilize an embrace engine to embrace content from a Cookbooks database that stores scripts associated with a Chef deployment tool by reading the scripts associated with a number of applications that are deployed by the Chef deployment tool.

At box 605 the method 601 can include determining a number of properties from each of the number of different deployment tools based on the monitored number of services. Determining the number of properties from each of the number of different deployment tools can include converting the embraced content into values that represent interactions between physical hardware of a server and the number of different deployment tools. The number of properties can include a flow of executing applications and services for the number of deployment tools. In some embodiments, the number of properties can include a user name, password, platform for execution, location of physical hardware, type of deployment tool utilized for deployment, among other properties that relate to execution of an application and/or services.

At box 607 the method 601 can include generating a component model by associating the number of properties to each of the number of services, wherein the component model is generated for a single deployment tool. Generating the component model can include connecting relationships between a platform utilizing the single deployment tool (e.g., a master deployment tool, etc.) and a number of different deployment tools. The connected relationships can be utilized by a platform utilizing the single deployment tool to invoke the number of different deployment tools.

Generating the component model can include generating a service design for deployment of applications based on the component model. The service design can be offered to a number of users via a customer portal as described herein. The number of users can subscribe to the service design and utilize the subscribed service design to execute a number of corresponding applications and/or services associated with the service design.

In some embodiments, the components of the component model can be connected a number of other components of the component model together through relationships. For example, an application component can be hosted on a server and connected to the server component in the component model. In another example, the application component can also be connected to a database component in the component model.

At box 609 the method 601 can include executing the number of services via the single deployment tool based on the component model. Executing the number of services via the single deployment tool can include executing a service design generated based on the component model. Executing the number of services can include utilizing the single deployment tool to invoke the number of different deployment tools to execute the number of services.

As described herein, the method 601 can enable a platform utilizing a single deployment tool to manage and execute a number of applications and/or services that are executed by a number of different deployment tools.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed is:

1. A system for a common deployment model, comprising:
   a physical processor;
   a memory storing machine readable instructions that, when executed by the physical processor, cause the processor to:
   embrace content from a number of different deployment tools by monitoring a number of services executed by each of the number of different deployment tools;
   determine a number of properties from each of the number of different deployment tools based on the monitored number of services and associate the number of properties to each of the number of services to generate a component model for the number of different deployment tools;
   associate the component model with a cost model; and
   instantiate the component model with the associated cost model; and
   execute the number of services based on the component model.

2. The system of claim 1, wherein the number of different deployment tools comprises deployment tools of platform as a service (PaaS) and software as a service (SaaS).

3. The system of claim 1, wherein the number of services is executed utilizing a corresponding deployment tool that is associated with the number of services.

4. The system of claim 1, wherein the component model is a mapping of execution logic to perform each of the number of services.

5. The system of claim 1, wherein the number of values is retrieved from a database based on the component model to execute the number of services.

6. The system of claim 1, wherein the deployment model utilizes a single deployment tool format for the component model.

7. The system of claim 1, wherein the number of services is executed via a single deployment tool based on the component model.

8. A non-transitory computer readable medium storing instructions executable by a processing resource to:
   embrace content from a number of different deployment tools by monitoring a number of services executed by each of the number of different deployment tools;
   determine a number of properties from each of the number of different deployment tools based on the monitored number of services;
   generate a component model for a single deployment tool by associating the number of properties for a number of services;
   execute the number of services via the single deployment tool based on the component model.

9. The medium of claim 8, comprising instructions to determine content that corresponds to each of the number of services.

10. The medium of claim 8, wherein the content from the number of different deployment tools comprises information for executing the number of services including: a port, a user name, and a password.

11. The medium of claim 8, wherein the content from the number of different deployment tools comprises information for executing the number of services including: a corresponding service component, a corresponding platform component, and a corresponding application.

12. The medium of claim 8, comprising instructions to instantiate the component model for the single deployment tool.

13. The medium of claim 8, wherein the number of services is executed by retrieving a number of values from a database based on the component model.

14. A method for generating a common deployment model, comprising:
   embracing content from a number of different deployment tools by monitoring a number of services executed by each of the number of different deployment tools;
   determining a number of properties from each of the number of different deployment tools based on the monitored number of services;
   generating a component model by associating the number of properties to each of the number of services, wherein the component model is generated for a single deployment tool; and
   executing the number of services via the single deployment tool based on the component model.

15. The method of claim 14, wherein the component model is stored in a database and instantiated to a number of users.

16. The method of claim 14, wherein generating the component model comprises generating a component model for a two-tier application with a number of services.

17. The method of claim 14, wherein executing the number of services includes executing the number of different deployment tools from the single deployment tool based on the component model.

18. The method of claim 14, wherein the component model is a mapping of execution logic to perform each of the number of services.

19. The method of claim 14, wherein the content from the number of different deployment tools comprises information for executing the number of services including: a corresponding service component, a corresponding platform component, and a corresponding application.

20. The method of claim 14, wherein the number of services is executed by retrieving a number of values from a database based on the component model.

\* \* \* \* \*